Patented Nov. 23, 1926.

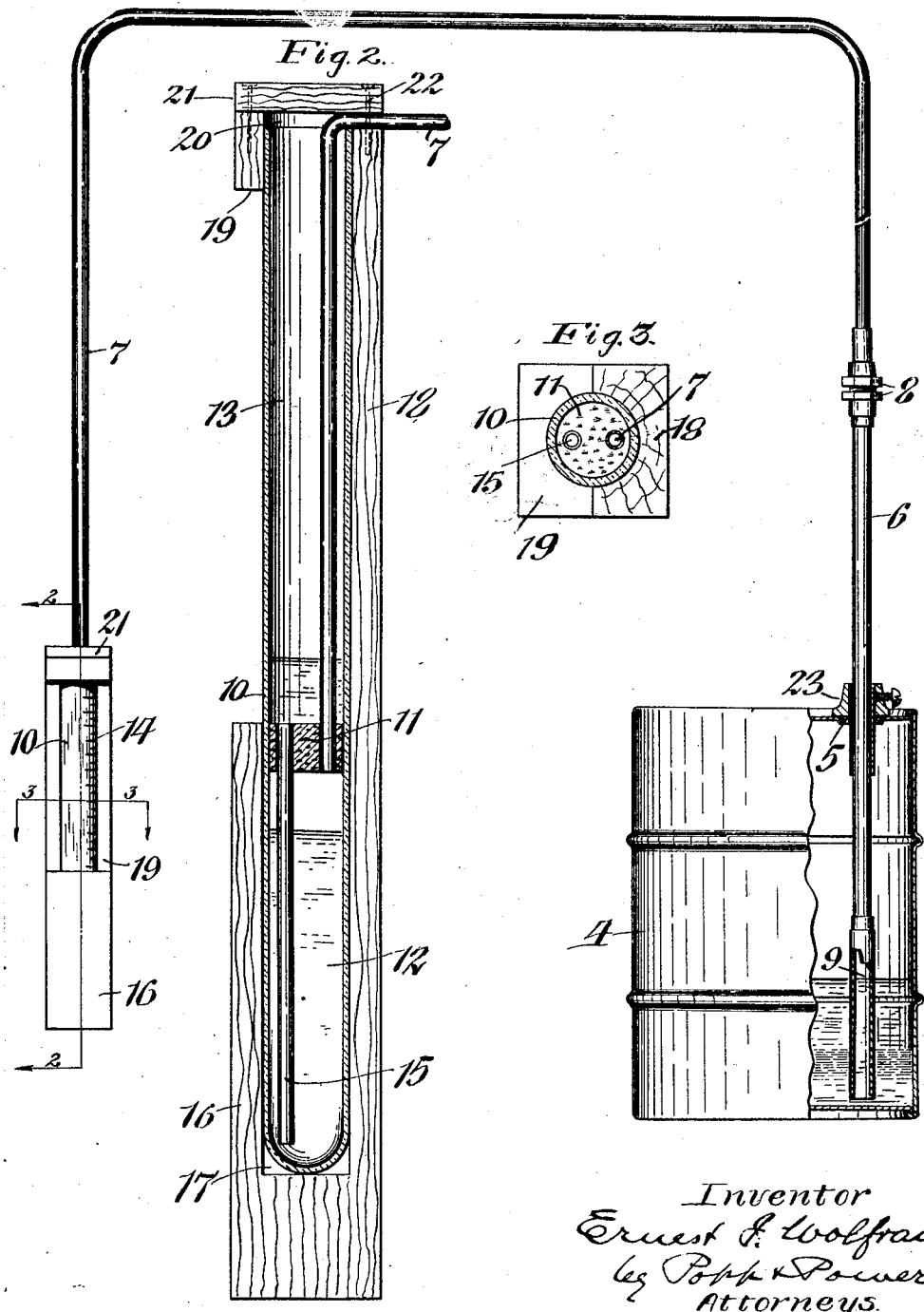

1,607,714

UNITED STATES PATENT OFFICE.

ERNEST J. WOLFRAM, OF BUFFALO, NEW YORK, ASSIGNOR, BY MESNE ASSIGNMENTS, TO THE GROLAN MANUFACTURING COMPANY, OF DAYTON, OHIO, A CORPORATION OF DELAWARE.

PRESSURE GAUGE.

Application filed September 27, 1923. Serial No. 665,078.

This invention relates to a pressure gauge which is more particularly designed for indicating the level of the liquid in a supply tank or storage receptacle from which fuel oil is drawn for supplying the burner of a heater for buildings such as oil heated boilers, or hot air heaters although the same may also be used for various other purposes.

At the present time fuel oil is furnished in tanks or barrels for heating domestic buildings or residences and no convenient means have been provided for determining how much fuel oil is in the tank and it therefore frequently happens that the supply of fuel oil runs out quite unexpectedly with embarrassing results and inconvenience.

It is, therefore, the object of this invention to provide a liquid level indicator of simple construction which can be readily applied to and removed from a barrel or tank of fuel oil, or used for similar purposes, and which will permit of readily and accurately determining the amount or level of the liquid in the tank, so that the users of the same can govern themselves accordingly and if desired replenish the supply in due time.

In the accompanying drawings:

Figure 1 is a front elevation of a liquid level gauge embodying my invention and applied to a tank of fuel oil for determining the level of the liquid in the latter, which tank is shown partly in section and on a reduced scale. Figure 2 is a vertical section of the indicating part of the gauge, on an enlarged scale, taken on line 2, 2 Figure 1. Figure 3 is a horizontal section, on an enlarged scale, taken on line 3, Figure 1.

Similar characters of reference indicate like parts in the corresponding figures.

The numeral 4 represents the barrel, tank or receptacle in which the liquid, for instance fuel oil, is stored preparatory to being used and in which the level of the liquid is to be ascertained by the use of this improved liquid level gauge.

In the present case this barrel is constructed of sheet metal and provided in its upper head with an opening 5 through which the fuel oil or other liquid is introduced into and removed from the barrel. Through this opening is introduced a transmitting tube whereby the fluctuations in the level of the liquid in the tank are transmitted to the indicating means, which transmitting tube in the present instance is made up of a receiving section 6 which projects downwardly through the opening 5 into the tank, and a delivery section tube 7 which connects with the indicating instrument and is detachably connected with the receiving section by means of a coupling 8 of any suitable construction.

At its lower end the receiving section of the transmitting tube is provided with a pressure head or tube 9 which is arranged vertically in the lower part of the tank and is connected at its upper end with a receiving tube 6 while its lower end is arranged close to the lower end of the tank, this pressure tube being preferably of somewhat larger diameter then the transmitting tube or conduit, as shown in Figure 1.

The indicating device or instrument embodying my invention may be constructed in various forms and still contain the essence of my invention, but in the preferred organization shown in the drawings, the same comprises an upright cylindrical casing or body 10 consisting preferably of glass or other transparent material, the lower end of which is closed and the upper end of which is open and leads to the external atmosphere. Intermediate of its upper and lower ends this casing or body is provided with a horizontal partition 11, which may consist of cork or other suitable material and fitted in the bore of the tubular casing either by friction or otherwise so as to form a liquid tight joint therewith. This partition in effect divides the space within the interior of the casing or body into a lower displacement chamber 12 which is adapted to receive a quantity of indicating liquid, and an upper indicating chamber 13 which is adapted to receive the liquid from the displacement chamber and return the same thereto in response to variations in the level of the liquid of the supply tank 4, so that the fluctuation in the height of the column of liquid in the indicating chamber will furnish a substantially correct indication of the level of the liquid in the tank. This variation in the level of the column of liquid in the indicating chamber 13 is visible from the exterior thereof owing to the fact that the body of this chamber is made of transparent material. The variation in the height of this column of itself may serve as a gauge for indicating the amount of liquid present in the tank 4, but if desired the front side of the indicating chamber may be provided with graduations, as shown at 14 for the purpose of more definitely and accurately reading the height of this column and determining the approximate amount of liquid present in the supply tank.

The delivery end or section 7 of the transmitting tube or conduit communicates with the upper end of the displacement chamber, this being preferably accomplished by passing the corresponding portion of the delivery section 7 downwardly through the open upper end of the indicating chamber 13 and downwardly along the rear part of the inner side of the same and through the adjacent part of the partition 11 so that the lower end of this portion of the transmitting tube communicates with the upper end of the displacement chamber.

Communication is established between the lower end of the indicating chamber and the lower end of the displacement chamber by means which preferably consist of a displacement tube 15 arranged lengthwise within the displacement chamber adjacent to the front side thereof and terminating at its lower end adjacent to the lower end of the displacement chamber, while its upper end extends through the adjacent part of the partition 11 and is secured therein so that this displacement tube is mounted on this partition and establishes communication between the displacement chamber and the indicating chamber. The indicating member of this liquid level gauge may be mounted and supported in any suitable manner upon an available part of the building and for this purpose the casing of the indicating member is provided with a frame, preferably constructed of wood, the lower part 16 of which is provided with an upwardly opening pocket 17 which receives the lower or displacement portion of the casing so as to completely enclose the same and afford a protection therefor while the upper part of this frame is provided with a rear wall 18 which engages with the rear side of the indicating portion of the casing and is provided on its front side with an opening 19 through which the front side of the indicating chamber is visible and permits of reading the height of the column of liquid therein, and the upper end of this frame being provided with an opening 20 which receives the open upper end of the indicating chamber. The body of the indicating member is mounted on the frame by passing the same downwardly through the opening 20 and into the pocket 17 and these members are maintained in an assembled position by means of a cap or plate 21 arranged over the upper end of the frame so as to cover the opening 20 and secured thereto by means of nails 22, as shown by dotted lines in Figure 2 or by any other suitable means.

In the use of this apparatus, the attendant inserts the receiving end of the transmitting conduit together with the pressure head or tube 9 through the opening 5 of the tank and supports this head in such a position therein that its lower end stops short of the lower head of the tank for which purpose a collar 23 is clamped on the receiving section 6 of the transmitting tube and permits it to rest on the top of the upper tank head, as shown in Figure 1. As the pressure head 9 is lowered in the supply tank, the liquid therein rises in the pressure head and causes the air within the same to be displaced. This displaced air passes from the transmitting tube into the upper end of the displacement chamber 12 whereby the indicating liquid in the latter is forced downwardly in the displacement chamber and causes it to pass from the lower end of the latter upwardly through the displacement tube 15 and into the lower part of the indicating chamber 13, so as to form a column of indicating liquid in the latter. The height of the column in the indicating chamber is directly proportionate to the height of the liquid level in the tank 4 and as the height of the liquid level in the tank rises or falls a corresponding raising or lowering of the level of the indicating liquid column in the chamber 13 occurs. It therefore follows that the indicating liquid column is always responsive to variations in the height of the liquid level in the tank and thus enables the attendant to determine the amount of liquid in the tank and also warns the attendant to replenish the supply in the latter in due time.

This liquid gauge is not only very simple and inexpensive in construction, but the same is also very reliable in its operation and not likely to get out of order. Furthermore, the same can be readily and conveniently used by any householder inasmuch as it requires no particular skill in making practical use of the same, thereby rendering the same particularly desirable for household use by persons who are usually unacquainted with mechanical devices.

I claim as my invention:

1. A pressure gauge comprising a transparent tubular casing open at its upper end and closed at its lower end, a partition frictionally mounted in the bore of said casing substantially between its upper and lower ends and dividing the same into a liquid displacement chamber to contain an indicating liquid and an upper indicating chamber to receive liquid from said displacement chamber, a displacement conduit within the displacement chamber and supported by and extending through said partition and opening at its upper end into the lower part of said indicating chamber and at its lower end into the lower part of said displacement chamber, and a transmitting tube which communicates with the upper end of the displacement chamber.

2. A pressure gauge comprising a casing consisting of a tube of transparent material which is open at the top and closed at the bottom, a partition which engages frictionally with the bore of said casing between its upper and lower ends and divides the same into a lower liquid displacement chamber adapted to contain an indicating liquid and an upper indicating chamber adapted to receive liquid from said displacement chamber, a displacement conduit arranged within the displacement chamber and supported by and extending through said partition and opening at its upper end into the lower part of said indicating chamber and at its lower end into the lower part of said displacement chamber, and a transmitting tube having one part extending downwardly through said indicating chamber from the upper end thereof and through said partition and thence downwards into said displacement chamber.

3. A pressure gauge comprising a casing consisting of a tube of transparent material which is open at the top and closed at the bottom, a partition which engages frictionally with the bore of said casing between its upper and lower ends and divides the same into a lower liquid displacement chamber adapted to contain an indicating liquid and an upper indicating chamber adapted to receive liquid from said displacement chamber, a displacement conduit arranged within the displacement chamber and supported by and extending through said partition and opening at its upper end into the lower part of said indicating chamber and at its lower end into the lower part of said displacement chamber, a transmitting tube having one part extending downwardly through said indicating chamber from the upper end thereof and through said partition and thence downwards into said displacement chamber, and a frame enclosing said casing but non-integral therewith and provided in its lower part with a pocket which receives the lower part of said transparent tube and having the upper part of its front wall provided with a sight opening which exposes said indicating chamber, and a cap attached to the top of the frame for confining the casing therein.

4. In a pressure gauge, the combination with a single transparent tubular casing having a partition across its bore at an intermediate part dividing the casing into an upper indicating chamber and a lower displacement chamber, of a displacement conduit in the displacement chamber and extending through the partition to provide a communication between the lower part of the displacement chamber with the lower part of the indicating chamber, said conduit being seated at its upper end in the partition to be supported thereby, and a transmitting tube communicating with the upper part of the displacement chamber.

ERNEST J. WOLFRAM.